May 13, 1958
O. M. REVELL
2,834,600
JIG SAW CHUCK
Filed Aug. 15, 1956
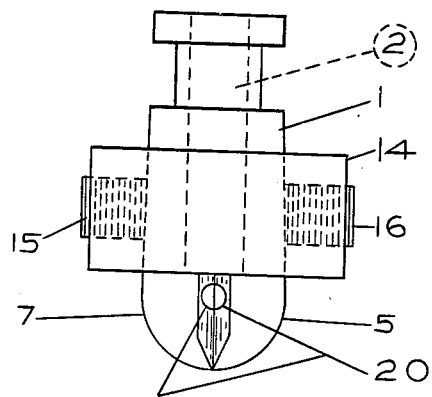
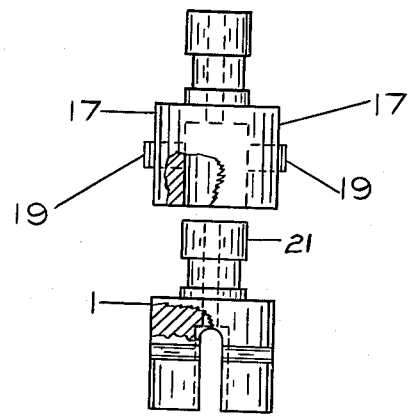
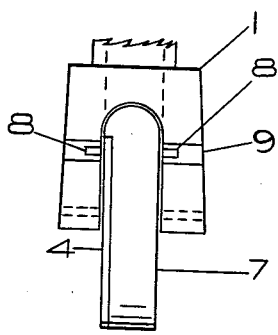
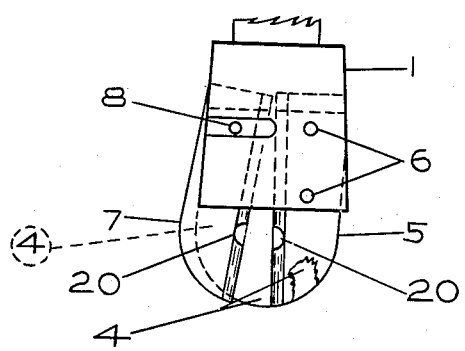
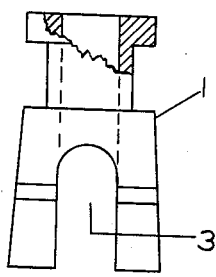
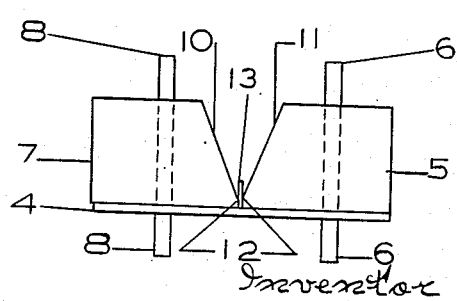
Inventor
Otto Merrian Revell
per L. S. Mitchell
Attorney

United States Patent Office 2,834,600
Patented May 13, 1958

2,834,600

JIG SAW CHUCK

Otto Merrian Revell, North Star, Alberta, Canada

Application August 15, 1956, Serial No. 604,246

3 Claims. (Cl. 279—107)

My invention relates to chucks for jig saws, having particular reference to an improved device adapted for accurately centering the saw blade in the chuck.

In the art to which the invention relates, in the use of chucks for jig saws it is important to center the saw blade in the chuck to get accurate work. In addition machines of this character are more usually equipped with a roller guide under the table, and above the table there is a hold down with a guide and roller.

It is the purpose of the present invention to effect improvements in these features, first by providing centering means for the saw blade by positioning the blade between a pair of jaws and aligning it by a back plate fixed to one of the jaws; and further to provide a short form of chuck for use with the guide and roller, and with this an extension for the chuck eliminating the need for the guide and roller.

By using the chuck with the extension, doing away with the guides and rollers, the blade can be clamped at any length, which is an advantage in that a short blade will cut faster and turn easier than a long one without breaking. By lowering the upper chuck so it will just clear the work the portion of the blade that is not in use is housed and protected from damage by coming in contact with guides and rollers, and as the part of the blade in contact with the work becomes dull or broken the blade can be lowered and used again, so that a blade can provide three or four usable sections. Added to this the jaws of the chuck are shaped to protect the blade teeth and prevent them coming in contact with the jaws, dulling the points and taking out the set.

To accomplish this a chuck in accordance with my invention and adapted for use either as a top or bottom chuck is provided in the accompanying drawings in which like characters of reference indicate like parts throughout the several views, the showing being somewhat enlarged for convenience of illustration, and in which:

Fig. 1 is a front view of a chuck assembly embodying my improvements.

Fig. 2 is a side view, partly broken away, of a chuck body and an extension for the chuck body, and including means for attachment of the extension on the chuck body.

Fig. 3 shows a side view of the chuck body with movable jaw mounted therein, shown partly broken away.

Fig. 4 shows a fragment of the chuck body taken from the front, broken away in part, and including the jaws and back plate.

Fig. 5 shows a side view of the chuck body taken by itself, illustrated partly broken away.

Fig. 6 shows an enlarged top view of the jaws and back plate, and showing a saw blade gripped between the jaws.

Having reference to the drawings there is provided a chuck body 1 with central bore 2 terminating at the working end of the chuck in a slot 3 transversely of the chuck body and in which is mounted a back plate 4 and a jaw 5 secured thereto by pins 6 extending through the chuck body and back plate. There is also provided a movable jaw 7 pivoting on pins or trunnions 8 that engage in slots 9 extending transversely of the slot 3.

The jaws 5 and 7 have their inner faces cut away at 10 and 11 with the exception of a small portion 12 at the back of each adapted to grip the saw blade 13. This gripping portion of the jaws would only be about one thirty-second of an inch in depth and would be made up of two parallel faces between which the blade is held. By this the saw teeth are left free from contact with the jaws.

For securing the jaws in clamping relation to the saw blade I provide a collar 14 slidable on the chuck body and engaged by screws 15 and 16 that bear against the jaws, the screw 15 bearing against the movable jaw 7 forcing it inward against the fixed jaw 5. The screw 16 merely serves as a positioning and tightening screw for the collar.

Where it is desired to use the longer chuck an extension 17 is added to the chuck body, Figure 2, secured by set screws 19 engaging the stem portion 21 of the chuck body.

In mounting the blade between the jaws the collar set screws are loosened allowing the jaws to be parted, which can be done by inserting a convenient tool, such as a screw driver, in co-operating openings 20 in the two jaws. The saw blade is then inserted and pressed back firmly against the back plate 4 between the flat parallel portions 12 of the jaws, a small screw driver or the like being used for this. The set screw 15 in the collar is then tightened engaging the movable jaw against the saw blade, which blade would previously have been centered against the back plate, and the set screw 16 adjusted.

To release the blade you loosen the set screws on the collar, or if it is desired to take out one or other of the jaws the collar can be removed entirely.

The device provides for quick and accurate centering of the blade in the chucks, at the same time protecting the blade and also permitting use of a portion only of the blade, the blade being shiftable in the chucks to present a fresh working portion when desired.

While I have herein provided a preferred embodiment of my invention it is obvious that changes in the construction and arrangement of parts would be permissible, and in so far as such changes come within the spirit and scope of the present invention as defined in the appended claims they would be considered a part hereof.

Having thus particularly described and ascertained the nature of my said invention what I claim and wish to secure by Letters Patent is:

1. In a jig saw chuck including a stem and integral body, said body having a transverse opening providing opposing flat parallel faces and a bore aligned centrally with said opening, a back plate positioned against one of the flat faces of said bore, a jaw in the slotted opening, means securing the jaw and back plate to the chuck body with the working face of said jaw adapted to align a saw blade held against said working face and back plate axially of said bore, a movable jaw pivoted in the slotted opening of the chuck body lying against the back plate in opposing relation to the jaw fixed to said back plate and between which jaws a saw blade is adapted to be held, and a collar embracing the chuck body slidable thereon, said collar including set screws adapted to be brought to bear against the jaws.

2. A device as defined in claim 1 and including an extension attachment comprising an element having an integral body and stem with central bore, said body further having an enlarged opening therein adapted for seating of the element body on the stem of the chuck body, and including a collar slidable on the body and set screws in the collar adapted on tightening to engage the chuck stem.

3. A device as defined in claim 1 in which the jaws have their opposing faces cut away in part leaving parallel blade gripping portions of less depth than the width of a blade to be gripped therebetween.

References Cited in the file of this patent

UNITED STATES PATENTS

| 483,195 | Woodruff | Sept. 27, 1892 |
| 1,634,422 | Holmes | July 5, 1927 |

FOREIGN PATENTS

| 462,292 | Canada | Jan. 3, 1950 |